US008972262B1

(12) United States Patent
Buryak

(10) Patent No.: US 8,972,262 B1
(45) Date of Patent: Mar. 3, 2015

(54) INDEXING AND SEARCH OF CONTENT IN RECORDED GROUP COMMUNICATIONS

(75) Inventor: Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 468 days.

(21) Appl. No.: 13/352,841

(22) Filed: Jan. 18, 2012

(51) Int. Cl.
*G10L 15/00* (2013.01)

(52) U.S. Cl.
USPC .......................... 704/251; 704/255; 707/776

(58) Field of Classification Search
USPC .................................... 704/251, 255; 707/776
See application file for complete search history.

(56) References Cited

U.S. PATENT DOCUMENTS

| | | | | |
|---|---|---|---|---|
| 5,710,591 | A * | 1/1998 | Bruno et al. | 348/14.09 |
| 5,835,667 | A * | 11/1998 | Wactlar et al. | 386/241 |
| 6,377,995 | B2 * | 4/2002 | Agraharam et al. | 709/231 |
| 6,636,238 | B1 | 10/2003 | Amir et al. | |
| 6,728,673 | B2 * | 4/2004 | Furuyama et al. | 704/254 |
| 7,181,393 | B2 * | 2/2007 | Lu et al. | 704/243 |
| 7,466,334 | B1 * | 12/2008 | Baba | 348/14.06 |
| 8,015,159 | B2 | 9/2011 | Boicey et al. | |
| 8,060,515 | B2 | 11/2011 | Smith-Semedo et al. | |
| 2001/0042114 | A1 * | 11/2001 | Agraharam et al. | 709/223 |
| 2009/0164449 | A1 | 6/2009 | Huang | |

OTHER PUBLICATIONS

Prüfer, Christian, Master Thesis: SPIM—New Approaches for Structured and Persistent Instant Messaging Conversations in the Context of Work-Related Environments, Jan. 10, 2007, 112pp., © Bauhaus-University Weimar, Germany.

* cited by examiner

*Primary Examiner* — Daniel D Abebe
(74) *Attorney, Agent, or Firm* — IP Spring

(57) ABSTRACT

In one embodiment, indexing content in streamed data includes receiving streams of audio data encoding a recording of a live ongoing group communication, where each stream of audio data encodes a different one of multiple voices. Each of the streams of audio data is provided to a recognizer to cause separate recognition of words in each of the streams. The recognized words are indexed to corresponding locations in each of the streams, and the streams are combined into a combined stream of audio data by synchronizing at least one common location in the streams. Embodiments allow accurate recognition of speech in group communications in which multiple speakers have simultaneously spoken, and accurate search of content encoded and processed from such speech.

19 Claims, 6 Drawing Sheets

INDEXING AND SEARCH OF CONTENT IN RECORDED GROUP COMMUNICATIONS

BACKGROUND

Digital recording and encoding is becoming more widespread with the use of cameras and microphones in or attached to computers and other electronic devices. Audio and images can be captured and encoded as digital data that can be conveniently replayed on other devices. Some communication applications and devices allow a user to record a discussion between users of connected or networked devices, such as a video conference or video chat. Users can replay a desired portion of a recorded communication to review the discussion or a particular topic discussed. However, users may not know or remember at what time or location in the recorded communication that a particular topic or subject was mentioned, and may spend an inordinate amount of time replaying different sections of the recording to find a desired section.

Some prior systems can recognize audio words encoded in a digital audio-video recording and store the recognized words as text, thus allowing a user to search for particular words in the recognized text from the recording. However, these systems have severe limitations when trying to accurately recognize words from a recording of a communication in which there are multiple speakers, such as a chat, conference, or discussion. One reason is that multiple speakers frequently tend to interrupt, argue with, or speak over each other, or otherwise speak simultaneously, which blends their speech together. This blending creates obscured or incomprehensible speech for listeners, especially in a recording of the speech which is typically performed by a device such as a microphone having reduced-quality recording fidelity and a single or limited listening position. This in turn creates extreme difficulty when trying to recognize speech in a digital recording as well as distinguish and search for content in the recording.

SUMMARY

Embodiments of the present application generally relate to indexing and/or searching recognized content in media streams encoding group communications. In some embodiments, a method for indexing content in streamed data includes receiving streams of audio data encoding a recording of a live ongoing group communication, where each stream of audio data encodes a different one of multiple voices. Each of the streams of audio data is provided to a recognizer to cause separate recognition of words in each of the streams of audio data. The recognized words are indexed with corresponding locations in each of the streams of audio data, and the streams are combined into a combined stream of audio data by synchronizing at least one common location in the streams.

In various embodiments of the method, each of the voices can be provided by a different speaker in the live ongoing group communication, and the locations in the combined stream of audio data can be indexed with corresponding speakers of the recognized words that correspond to the locations. The indexing of locations with speakers can include determining when a change of speaker occurs in the combined audio stream and indexing corresponding locations. The recognition of words can include use of different speech recognition models, each model used on a different stream of audio data. Each speech recognition model can be customized for the voice encoded in the associated stream of audio data. Some embodiments can include receiving one or more search criteria in a search request, searching the combined stream of data for matches to the search criteria by using the indexing of the locations and the one or more recognized words, and providing matches and corresponding matched locations in the combined stream of data. The search criteria can include at least one keyword, and the provided matches can include one or more of the recognized words matching the keyword. The one or more search criteria can be received during the live ongoing group communication, and the matches and corresponding matched locations provided in substantially real-time during the live ongoing group communication.

The indexing can include updating indexes with the one or more recognized words to the corresponding locations in associated streams of audio data, and updating an aggregated index combining information from the indexes. In embodiments having different speakers, the recognized words in the combined stream of audio data can be indexed to their corresponding speakers, and the search criteria include a specification of at least one speaker, such that words spoken by that speaker are matched to the search criteria. wherein the provided corresponding matched locations in the combined stream of audio data include locations at which segments of the combined media stream start, the segments including the matches wherein the segments can include segments corresponding to a speaker and divided by a change of the speaker, and/or segments divided by pauses in the voices of the speakers. The streams of audio data can be accompanied by at least one corresponding stream of video data encoding a recording of the live ongoing group communication, and/or the streams of video data can be combined into a combined stream of video data. Each of the streams of audio data can be received from a different client device over a communication network, the streams derived from microphones, each microphone associated with one of the speakers providing the voices in the live ongoing group communication at an associated client device. The combined media stream and the one or more recognized words can be provided to a client device to be output.

In some embodiments, a method for indexing and searching for content in streamed data includes receiving streams of audio data encoding a recording of a live ongoing group communication, where each stream encodes a different one of multiple voices, each of the voices provided by a different speaker in the group communication. Each of the streams of audio data is provided to a recognizer for separate recognition, and recognized words from each of the streams are received. The recognition includes use of a different speech recognition model for each stream of audio data, and each speech recognition model is customized to the voice encoded in the associated stream. The recognized words are indexed to locations of data in each of the streams of audio data from which the recognized words were recognized. The streams are combined into a combined stream of audio data by synchronizing at least one common location in the streams. The locations and recognized words in the combined stream are indexed to corresponding speakers of the recognized words. Search criteria are received in a search request, including at least one keyword and a specification of at least one particular speaker. The combined stream of data is searched for words matching the search criteria by using the indexing of the locations, of the recognized words, and of the speakers. Matching words, corresponding locations, and corresponding speakers from the combined stream of data are provided as results.

In some embodiments, a system for indexing words of encoded streaming data can include a storage device storing a plurality of streams of audio data encoding a recording of a live ongoing group communication, where each stream of audio data encodes a different one of multiple voices. The system also includes at least one processor accessing the storage and operative to perform operations, including providing each of the streams of audio data to a recognizer to cause separate recognition of words in each stream, indexing the recognized words with corresponding locations in each stream, and combining the streams into a combined stream of audio data by synchronizing at least one common location in the streams.

Some embodiments of the system can include the processor performing operations including receiving one or more search criteria in a search request, searching the combined stream of data for matches to the search criteria by using the indexing of the locations and of the one or more recognized words, and providing matches and corresponding matched locations in the combined stream of audio data. In some embodiments, each of the voices can be provided by a different speaker in the live ongoing group communication, and further operations can include indexing the locations with corresponding speakers of the words that correspond to the locations. The search criteria can include a specification of at least one particular speaker, such that words spoken by the speaker from the combined stream are matched to the search criteria specifying the speaker.

DETAILED DESCRIPTION

One or more embodiments described herein relate to indexing recognized content in streams of data to locations in the streams, and combining the streams of data and recognized content. For example, in an audio or audio-video real-time group communication, each user provides a media stream of audio data encoding the user's voice, and the streams are subject to speech recognition and then combined into a combined media stream. Some embodiments search the combined media stream for recognized content according to received search criteria.

Embodiments described herein increase the accuracy of speech recognition of a digital recording of a group communication involving multiple participants and voices. Words can be recognized as accurately for simultaneous speech from multiple voices as for a single voice, avoiding the problems in prior recognition of content in recordings having multiple simultaneous voices. Furthermore, embodiments herein can increase accuracy of searches involving more-accurately recognized content as well as allowing other search criteria such as speaker of the content. Review and replay of an encoded group communication is made efficient and easy through features described herein.

Methods and systems are described herein associated with particular implementations. However, one of ordinary skill in the art will recognize that these methods and systems will operate effectively in other implementations.

Figure 1:
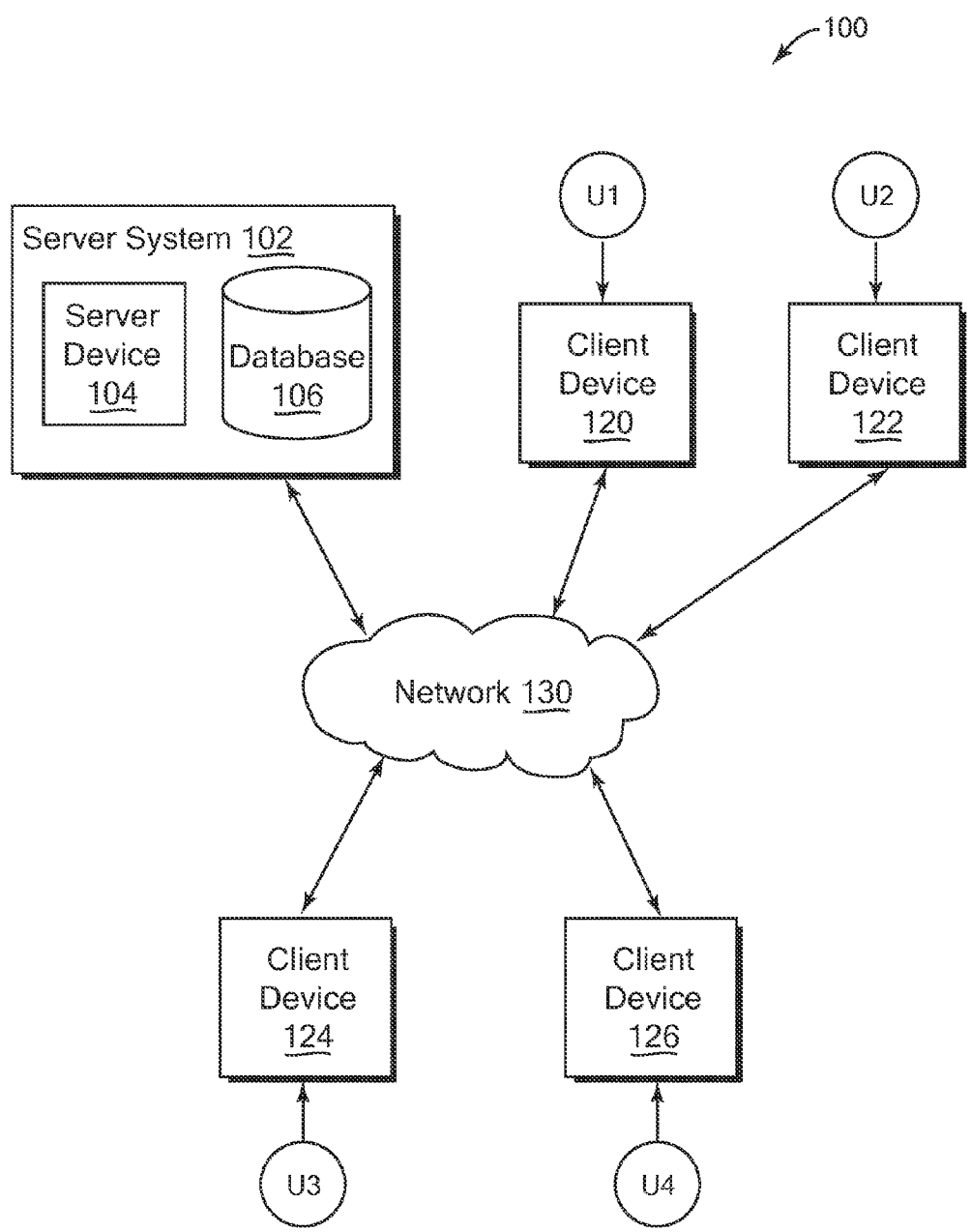
FIG. 1 is a block diagram of an example network environment which may be used for one or more embodiments described herein.

FIG. 1 illustrates a block diagram of an example network environment 100, which may be used in some embodiments to implement one or more features described herein. In some embodiments, network environment 100 includes one or more server systems, such as server system 102 in the example of FIG. 1. Server system 102 can communicate with a network 130, for example. Server system 102 can include a server device 104 and a database 106 or other storage device. Network environment 100 also includes one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. In other embodiments, network environment 100 may not have all of the components shown and/or may have other elements including other types of elements instead of, or in addition to, those described herein.

In various embodiments, end-users U1, U2, U3, and U4 may communicate with each other using respective client devices 120, 122, 124, and 126, and respective to features described herein each user is a participant in a group communication, such as a chat, conference, discussion, or other communication. In one example, users U1, U2, U3, and U4 may interact with each other in the group communication, where respective client devices 120, 122, 124, and 126 transmit media streams to one or more server systems such as system 102, and the server system 102 provides appropriate media streams to the client devices such that each client device can experience the media streams provided from all the clients of participating users.

In some embodiments, the media streams may each include an audio stream of digital audio data encoding a captured and recorded voice (e.g., speech) of an associated user. Each audio stream can be from a different client device and encode a different voice provided by the associated speaker in the group communication. For example, the audio streams have captured audio speech from the participating users U1-U4 and, when sent to other clients in the group, cause audio to be output on one or more speaker devices residing at each client device to users U1-U4, or to any selected subset thereof. In some embodiments, the media stream can include different types of media streams, such as one or more audio streams and optionally one or more video streams. The video streams may have encoded one or more digital video images or frames captured at the client devices and, after being sent to other group clients, cause the video images to be displayed at each client device to users U1-U4 or any selected subset thereof. Also, the media streams may include media streams being transmitted in different directions relative to each client device 120, 122, 124, and 126, such as one or more outbound streams and/or one or more inbound streams. As described according to features herein, a combined media stream can also be sent to the client devices from one or more servers, as well as associated recognized content derived from the media streams, as detailed below. In some embodiments, a "user" can be a participating speaker in the group communication, or in other embodiments a user (such as a user performing a search in a media stream) can be different than the speakers providing the encoded voices. In some embodiments, a "user" can include one or more programs as well as persons that interface with the system or network.

Figure 2:
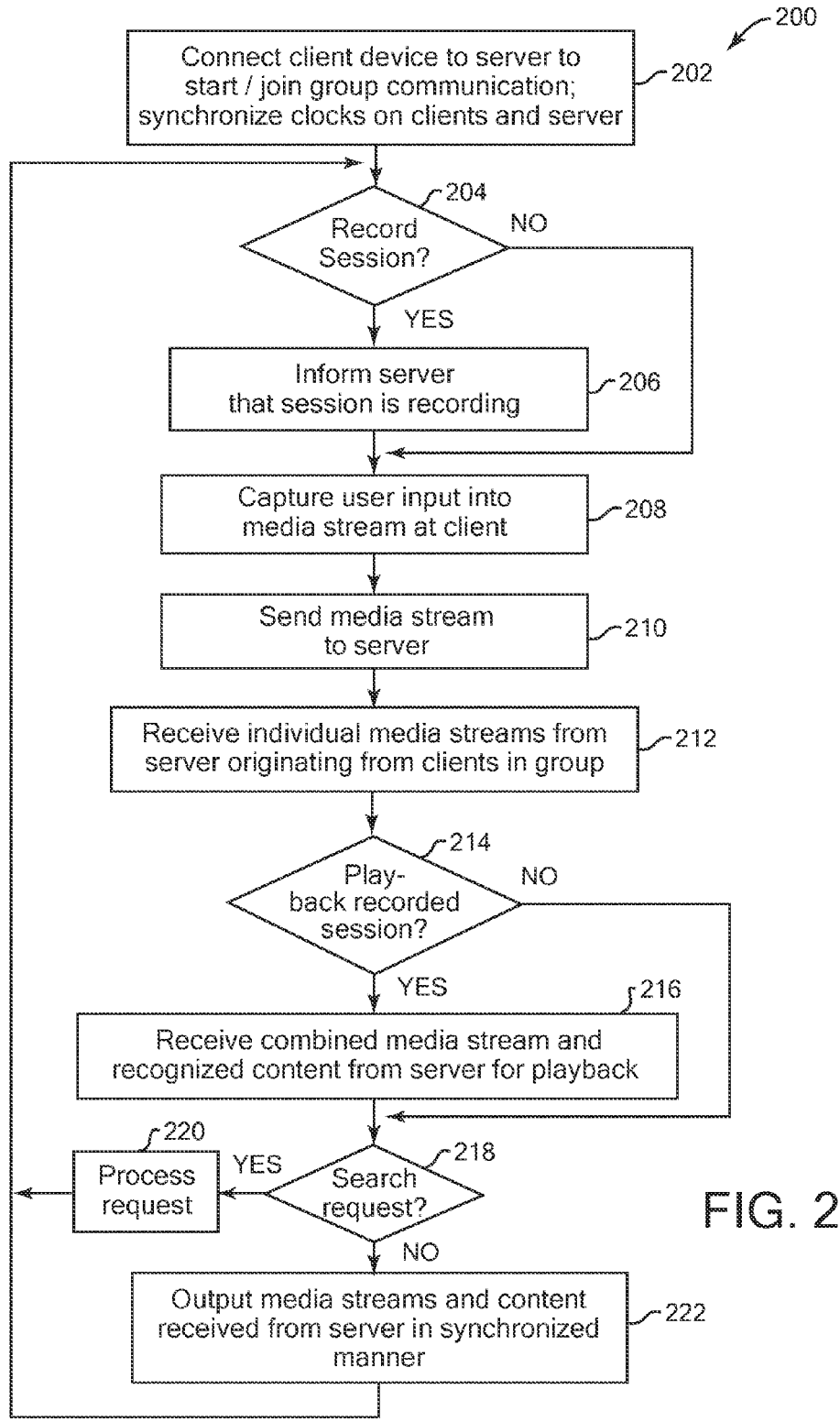
FIG. 2 is a flow diagram illustrating an example method of enabling output and search of media streams encoding a recording of a group communication, according to one embodiment.

FIG. 2 is a flow diagram illustrating one example of a method 200 of enabling output and search of media streams encoding a recording of a group communication. In some embodiments, method 200 can be implemented, for example, on a client device 120, 122, 124, or 126 as shown in FIG. 1. In described examples, the client device includes I/O devices such as speaker devices for outputting audio to the user, and a microphone for capturing sound, such as the voice and speech of the user. In some embodiments, the client device includes a display device for outputting images to the user, and a camera for capturing images (e.g., of the user). Method 200 can be implemented by program instructions or code, which can be stored on a computer readable medium. Alternatively, the method 200 can be implemented in hardware (logic gates, etc.), or in a combination of hardware and software. The method 200 can be provided as part of or component of an application running on the client device, or as a separate application or software running in conjunction with other applications and operating system.

The method is initiated in block 202, in which the client device connects to a server system 102 to start or join a group communication. For example, another user of a different client device 120, 122, 124, or 126 may have created an audio chat, video chat (including audio), conference call, or other group communication, which is facilitated and broadcast by the server to eligible client devices. The user of the client device first performing method 200 can initiate a group communication and broadcast invitations to other users of client devices. In some embodiments, each user in the group communication has an established online account or identity that is known or registered by the server, e.g., on database 106, including any personalized data such as settings, recognition model data, etc. Once multiple users are connected in the group communication, group information can be output, e.g., displayed on a display screen of the client device. For example, some embodiments can display a video chat interface in a graphical user interface (GUI), including controls for selecting different commands affecting functionality of the user and/or the group communication, and an area of the screen dedicated to each user and that user's input to the communication. One example of a GUI including features described herein is described below with respect to FIG. 6.

Synchronization of clocks between the client and server can also be performed, such that all clients in the group communication have clocks synchronized with the server and each other. This allows common timestamps to be correlated between individual media streams, as described below. This synchronization can be performed in block 202 after a client connects to the server and/or connects to a group communication, or can be performed at another point in the method 200.

In block 204, the process checks whether the current group communication session is being recorded or is to be recorded. For example, in some embodiments, the user can select a "record session" button or similar control in the displayed GUI to cause the group communication to be recorded and encoded in media stream(s) of data, and can select the same or different button or other control to stop recording and encoding the communication. Or, user preferences or settings or other criteria can determine if the session is to be recorded. If the session is not (currently) being recorded, the process continues to block 208, described below. If it is being recorded, then in block 206 the client informs the server that the session is recording.

In block 208, the client captures user input and encodes the input into an individual media stream associated with the user at the client device. For example, in some embodiments the client records the user input by controlling a microphone that captures the user's voice including speech or other sounds, and by digitizing and encoding this audio data into a stream of audio data. In some embodiments, the individual media stream output by the client device only includes an audio stream created from captured audio information. In other embodiments, visual information is also captured, such as by a camera or other visual sensor, and digitized and encoded into a video stream of video data. In such embodiments, one or more audio streams and one or more video streams can be synchronized and combined into the individual media stream output by the client device. In block 210, the individual media stream of encoded content is sent from the client to the server via the network 130.

In block 212, the client receives individual media streams from the server, the individual streams originating from other clients in the group. For example, the server sends the individual media streams it receives from all of the group clients to each other client in the group. In some embodiments, each individual media stream includes an audio stream from each client including audio data derived from the user's voice at that client, and may include a video stream including images at that client. In block 214, the process checks whether the client is to play back or otherwise output a recording of a communication session. The session to be played can be an earlier portion of the session that is currently taking place and being recorded (encoded in streams of data), or can be a portion of a media stream encoding a previous (or current) session between any users. In some embodiments, the client device can receive a command from a user indicating that a recorded session (e.g., a stored stream of data that encodes a recording) is to be played back, such as a selection of a playback button in a GUI or other control. Or, preferences or settings can determine if playback is to be performed. In some embodiments, a user requesting playback can select whether a recorded session is to be played back on that user's client alone, or on that user's client as well as one or more other clients of the group communication. If no playback of a recorded session is to be performed, the process continues to block 218, described below.

If a recorded session is to be played back, then in block 216 a combined media stream and recognized content is received from the server for playback. The combined media stream is a media stream including data from all the individual media streams contributed to by clients in the group of the recorded session. For example, the combined media stream can include all audio streams of the group users superimposed on each other. In some embodiments, video portions corresponding to a user who is speaking during the group communication are included in a combined video stream in the combined media stream.

In block 218, the process checks if a search request with search criteria have been received. If so, the process continues to block 220 to process the search request, which is described in greater detail below with respect to FIG. 3. After block 220, or if no search request is currently received, the process continues to block 222 in which the media streams and content received from the server are output in a synchronized manner. For example, in some embodiments all individual media streams received from the server from each client in the group can be output, including being displayed on a display screen of the client and output as audio from speaker devices, where each individual media stream is displayed in its own window or view in a GUI. A combined media stream, if received in block 216, can also be displayed in its own window and its audio output. In addition, other data associated with the combined media stream can be output, such as recognized content (e.g., text recognized from speech) displayed in a window that is synchronized with the playing of the combined media stream, and/or speaker information (for speech output at the same time, the corresponding text can be displayed sequentially, for example). If a search request and results have been provided from block 220, then the search results can be output, and in some embodiments the combined media stream can be started at a selected location of the stream corresponding to a selected search result, if such a selection has been made. The process then returns to block 204 to continue providing output data and receiving input data.

It should be noted that the blocks described in the method of FIG. 2 can be performed in a different order than shown and/or simultaneously (partially or completely) with other blocks, where appropriate. For example, the method can output and receive media streams in a different order. The method can check for and/or process playback and/or search requests simultaneously with the processing of other blocks or events, such as receiving and outputting media streams. In some embodiments, process checks such as blocks 204, 214 and 218 can occur multiple times, in a different order, and/or at different times in the method.

In other embodiments, the client device can perform one or more functions of the server locally on the client, instead of or in addition to the server performing the processing. Some such functions or blocks are described below with respect to FIG. 4. In still other embodiments, one or more blocks or functions described in FIG. 2 as being performed by the client can instead be performed by the server. For example, the server can display a GUI or provide other output and can receive all input from the user, process the input, and provide all output of the display and other devices, with the client acting as only as a "dumb" input and output device.

Figure 3:
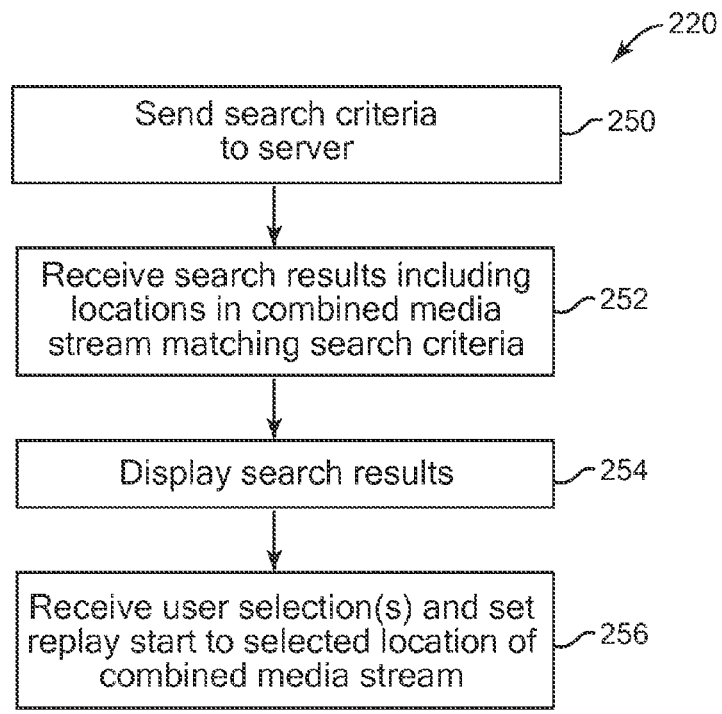
FIG. 3 is a flow diagram illustrating an example method for processing a search request at a client, according to one embodiment.

FIG. 3 is a flow diagram illustrating one example of a method for block 220 of FIG. 2 in which a search request is processed by a client device. In block 250, the one or more search criteria that were received by the client in the search request are sent to the server. In block 252, the client receives results from the server search, which can include locations (or timestamps) in the combined media stream that match the search criteria. The received results can also include a list of the matched recognized content and/or corresponding speakers of the matched content. The client can also receive the combined media stream itself in this block, if the combined stream was not received previously. As described above with respect to block 216 of FIG. 2, the combined media stream includes data from the individual media streams from the clients in the group. The matched locations in the combined media stream correspond to recognized content that matches the search criteria. For example, if the user wanted to search a recorded session to find all occurrences of a word "baseball," then the server matches the search criteria of "baseball" to all recognized words of "baseball" in the combined media stream, and the locations of those matched words are received at the client from the server. Matched locations can also match search criteria including one or more speakers, particular type(s) of segment start locations in the combined media stream for playback, etc.

In block 254, the client displays the search results. The results can be displayed in a wide variety of formats in different embodiments. In one example, the recognized content units (such as words or phrases) can be displayed in a list, with the corresponding locations in the combined media stream displayed alongside, e.g., as timestamps relative to the start of the combined media stream. In some embodiments, corresponding speakers who contributed the matched recognized content units can also be displayed in the list of search results.

In block 256, if the client has received a user selection of the search results, in response, sets a replay start location of the combined media stream at a location corresponding to the selection. For example, in some embodiments, the user can select one of the displayed search results and the playback can jump to the location in the combined media stream corresponding to the selected result. The combined media stream can then be replayed from that start location in block 222 of FIG. 2. In some embodiments, the location jumped to can be the start of an indexed segment in the combined media stream, such as the start of a phrase, sentence, or paragraph, or a point at which a speaker started speaking, and in some embodiments these start locations can be included in search results. In some embodiments, the client can also set the display of recognized content to a location in synchronization with the selected location of the combined media stream, such as appropriate recognized text displayed alongside output audio and/or video, similarly as described above with reference to block 222 of FIG. 2.

In other embodiments, the client device can locally perform some or all of the functions of the server in the process of FIG. 3, instead of sending and receiving information to and from the server. For example, some of or all of the combined media stream and/or recognized content can be stored at the client, so that the client can perform the search of the content locally.

Figure 4:
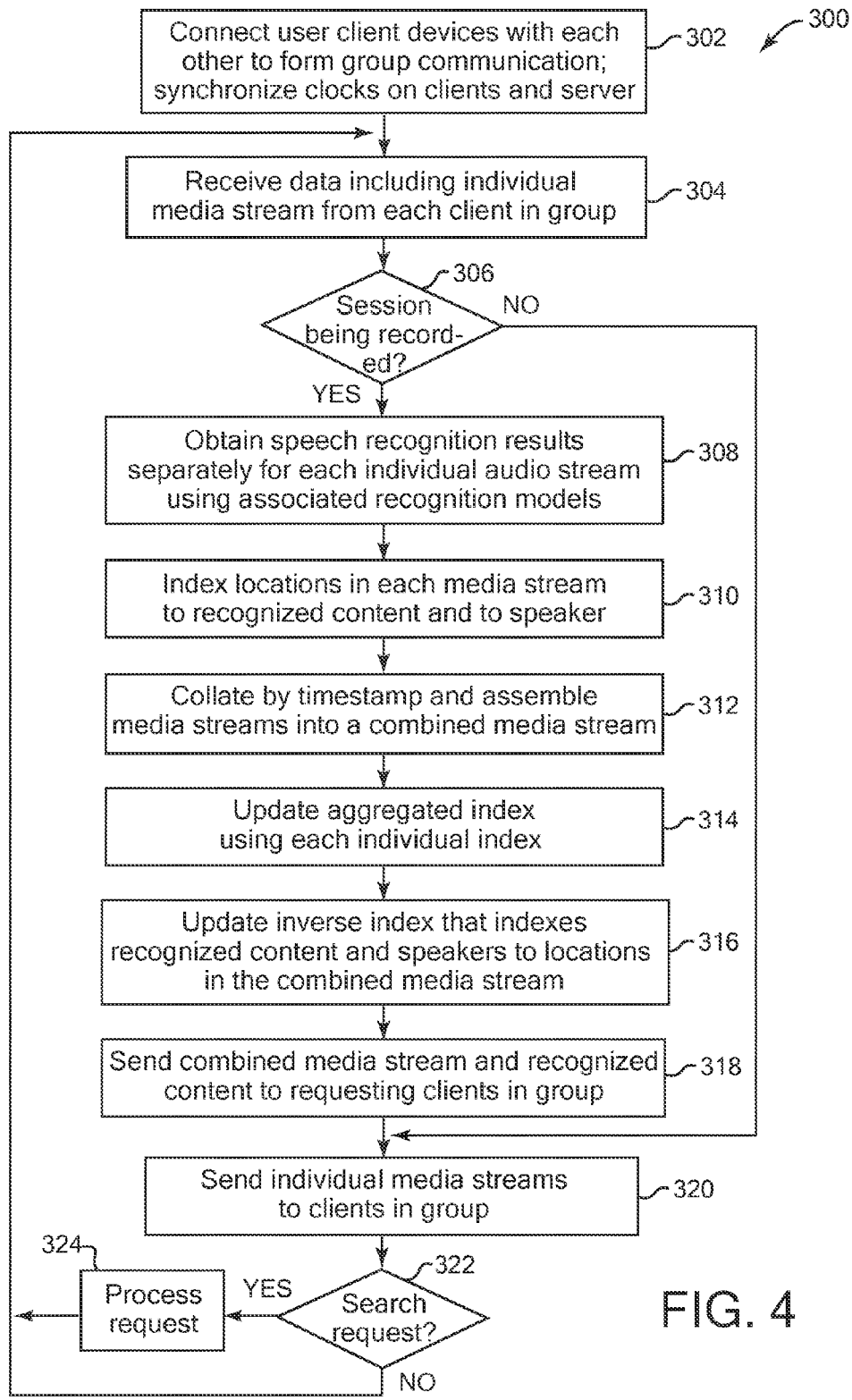
FIG. 4 is a flow diagram illustrating an example method of enabling indexing and search of recognized content in a media stream encoding a recording of a group communication, according to one embodiment.

FIG. 4 is a flow diagram illustrating one example of a method 300 of enabling indexing and search of recognized content in a media stream encoding a recording of a group communication. In some embodiments, method 300 can be implemented, for example, on a server system 102 as shown in FIG. 1. In described examples, the server system includes one or more processors or processing circuitry, and one or more storage devices such as a database 106. In some embodiments, different components of a server and/or different servers can perform different blocks or other parts of the method 300. Method 300 can be implemented by program instructions or code, which can be stored on a computer readable medium. Alternatively, the method 300 can be implemented in hardware (logic gates, etc.), or in a combination of hardware and software.

The method is initiated in block 302, in which the server connects user client devices of the group with each other to form a group communication. For example, each client can communicate with the server with a request for that client to start or join the group communication, and the server facilitates the communication between group clients. In block 304, the server receives data including an individual media stream from each client in the group. For example, each client can capture audio voice data and (optionally) video images from a user at the client using microphone, camera, and/or other input devices, encode the captured data, and send this data in an individual media stream to the server. In some embodiments, the individual media stream can thus include an audio stream and a video stream, enabled to play in a synchronized manner. In some embodiments, each of the individual media streams from group clients is associated with a common timeframe between all group members, so that each individual stream can be synchronized with each other individual stream. For example, each individual media stream can include timestamps indicating a time (in a standard timescale) when each frame or portion of the stream was captured, recorded, and/or encoded. In addition, one or more of the clients may be sending data such as an indication that a user has selected to record the current session, where this indication can be received at the server in block 304. Each received individual media stream is associated with a particular user or "speaker" at the client sending the media stream. In some embodiments, these users can, for example, be registered with an account known to the server or otherwise have settings or preferences known to the server.

In block 306, the process checks whether the current group communication session is being recorded. For example, this can be determined based on any indications of such recording received from group clients in block 304. Some embodiments can provide other selections or states treated equivalent to recording to cause the indexing and combined media stream processing described below. If the session is not being recorded, the process continues to block 320, described below. Otherwise, in block 308 the individual audio streams are provided to a speech recognizer for separate recognition of each individual audio stream, and speech recognition results are obtained separately for each individual audio stream, thus providing recognized content for the received individual media streams. In some embodiments, the server performing method 300 includes a speech recognition module or application which can process the individual media streams and provide the results. In other embodiments, the server can send the individual media streams to one or more speech recognizers implemented in one or more other systems, such as over a network, and receives the results from that system. In embodiments in which new/additional individual stream data is continually being received by the server from clients, in block 308 the server can provide all recently received individual stream data to the recognizer which have not yet been provided for recognition.

The speech recognition results can be recognized content derived from the individual audio streams, such as text words. In some embodiments, the recognition is performed using associated recognition models, in which the recognizer knows a personalized speech recognition model associated with each of the users and thus associated with each of the individual media streams. These personalized models allow more accurate recognition of speech from each user, since each model has been previously tuned over time to the particular associated user's voice, tone, frequency, speech mannerisms, etc. In some embodiments, the method 300 can provide speaker identification information to a speech recognizer to allow content recognition using a personalized recognition model associated with and customized for the identified speaker. In other embodiments, a single general speech recognition model can be used for all the individual media streams, or the use of the personalized model can be selectable by a user. Since each individual media stream encodes only one speaker's voice, there is little difficulty in distinguishing multiple different voices from each other in the audio stream during, for example, interruptions or other occasions with multiple speakers speaking simultaneously.

In block 310, locations in each individual media stream are indexed to the recognized content from each stream and to the (main) speaker providing the voice encoded in the stream. In some embodiments, in block 310 the server updates an existing index with newly-obtained recognized words and associated locations. In some embodiments, the index can include multiple key-value pairs, where in each pair, the key is the location in the stream and the value is the recognized content unit, such as a word or phrase. For example, each recognized text word from an audio stream is indexed to a timestamp location in the audio stream where that recognized word was begun to be spoken. In addition, if phrases or sentences of multiple words are recognized content units, then the timestamp locations of the beginnings of each phrase or sentence can be indexed. Units that are collections of words such as phrases can be delimited by pauses in speech. Longer audio units may also be recognized, such as a "paragraph" that is delimited by a longer pause in speech than a phrase. Thus, a single location in an individual audio stream can be indexed to multiple recognized units, such as a word, a phrase, a paragraph, etc. In addition, each individual media stream is associated with the user in the group (speaker) that contributed the stream, so that each indexed location can be associated with the speaker of the associated content at that location (which is the same, single speaker for all content of each individual media stream). In some embodiments, the index thus can associate each location in the stream with recognized content and one or more names of the speaker of that content. The speaker data alternatively can be stored in separately-referenced storage.

In block 312, the multiple individual media streams (or newly-received portions thereof) are collated and assembled into a combined media stream. This can be accomplished, for example, by collecting common locations or timestamps in each individual media stream and synchronizing the streams according to these common locations. Once the streams are synchronized, the combined media stream can superimpose all the individual audio streams on each other, such that each audio stream is audible. In some embodiments, if video streams are also included in the individual media streams, then one image (frame) from one of the individual video streams can be selected to be the frame at any one corresponding frame location in the combined media stream, and images can be contributed by different video streams at different locations of the combined stream. For example, in some embodiments, only the speaker who is currently speaking in the group communication is normally displayed in a main window of a GUI on each client. In such embodiments, the video frames that would be displayed in such a main window can be the frames provided in the combined media stream. In addition, the method can synchronize the recognized content and speaker data from each individual media stream with the combined media stream, such that recognized content units correspond with the locations in the combined stream at which they were encoded or spoken.

In block 314, an aggregated index is updated (or an aggregated index is created if not existing) based on each individual index created or updated in block 310. The aggregated index references all the locations of the combined media stream with all recognized content associated with each of those locations, as well as the speaker(s) associated with the recognized content at each of those locations. Thus each location or timestamp of the combined media stream can be indexed to one or more words, phrases, or other recognized units, received from all users speaking at that location in the stream, and can be indexed to the speakers speaking at the point in time represented by the location in the stream. Furthermore, each recognized unit is associated with its corresponding speaker in the index. The aggregated index therefore combines the recognized content from the individual media streams into combined recognized content within the aggregated index. The aggregated index may already exist if block 314 is a later iteration in the method, and in this case the aggregated index is updated with the new media stream locations and associated recognized content and speaker information.

In addition, in some embodiments the aggregated index can include indexed entries created to point to locations in the combined media stream at which different segments of the stream have been marked or divided to allow additional searching and/or playback capability, e.g., based on segmentation of the combined media stream. For example, aggregated index entries can point to locations in the combined stream at which a change in speaker occurred, e.g., where the audio content changed from being contributed by one speaker to being contributed by a different speaker. Such entries can allow search results or playback to refer to the beginning of a particular speaker's segment in the combined stream, for example. Other stream segments can be marked and indexed by locations at which a speaker paused in speech. For example, each such location can be a start location of a new "sentence" segment (e.g., if it is a shorter pause under a predetermined threshold duration) or new "paragraph" (e.g., if it is a longer pause over the threshold duration). Other segments of the combined media stream can be indexed based on other criteria. Furthermore, in some embodiments other locations within each segment (or otherwise in the combined stream) can also be indexed, such as halfway points, every minute of duration, etc.

In block 316, an inverse index is updated (or an inverse index is created if not already existing). The inverse index indexes recognized content to locations in the combined media stream. For example, if the indexes of blocks 310 and 314 provide key-value pairs indexing locations to words or phrases (or to other recognized units or stream segments such as sentences or paragraphs), then the inverse index can provide key-value pairs of words or phrases indexed to locations in the combined media stream. In some embodiments, key-value pairs can also be provided in the inverse index which index names of speakers to locations in the combined media stream corresponding to recognized units provided by those speakers. In other embodiments, the associated speaker data can be stored in a different index or data structure. The inverse index allows a search to be performed in which the search criteria is a keyword, allowing matches to the keys in the inverse index which provide associated locations in the combined media stream. The recognized content and indexing data can be stored with the combined media stream of data in some embodiments.

In block 318, a combined media stream and recognized content is sent to requesting clients in the group communication. For example, those clients who have requested to playback a recorded session (such as in block 214 of FIG. 2) need to receive the combined media stream and the recognized content that can be displayed in conjunction with the combined media stream. The combined media stream and recognized content that is sent can be encoding an ongoing group communication that is currently still in session, or can be a recording of any other previous session that a user of a group client has selected to be played. In an ongoing encoding session, the sent stream and content is the latest processed portion of the combined media stream and recognized content.

In block 320, the latest portions of the individual media streams are sent to each client in the group so that each client can display each group user's live stream in a separate window. In block 322, the process checks whether a search request for the combined stream has been received. For example, a user in the group communication may have input search criteria, such as one or more keywords and/or a particular speaker, as a search request applied to the combined media stream, and the search criteria were sent to the server by the client. If a search request was received, then in block 324 the request is processed, which is described in greater detail below with respect to FIG. 5. After block 324, or if no search request is currently received, the process returns to block 304 to receive additional media stream data and process/output that data in a similar fashion. In some embodiments, the additional media stream data is received from clients in an ongoing group communication.

It should be noted that the blocks described in the method of FIG. 3 can be performed in a different order than shown and/or simultaneously (partially or completely) with other blocks, where appropriate. For example, the method can check for and/or process indexes and/or search requests simultaneously with the processing of other blocks or events, such as receiving and outputting media streams. In some embodiments, process checks such as blocks 306 and 322 can occur multiple times, in a different order, and/or at different times in the method.

In other embodiments, variations of one or more above features can be used. For example, indexing recognized content with corresponding locations in the individual media streams, as in block 310, can be performed using different types of indexes, and/or the locations, recognized content, and speaker data arranged or indexed differently. One or more of the indexes can be maintained separately rather than aggregated, and/or the building of the inverse index can be omitted. In some other embodiments, the server can perform one or more functions of the client, instead of or in addition to the client performing those functions, or in other embodiments, one or more blocks or functions described in FIG. 4 as being performed by the server can instead be performed by one or more of the client devices.

Figure 5:
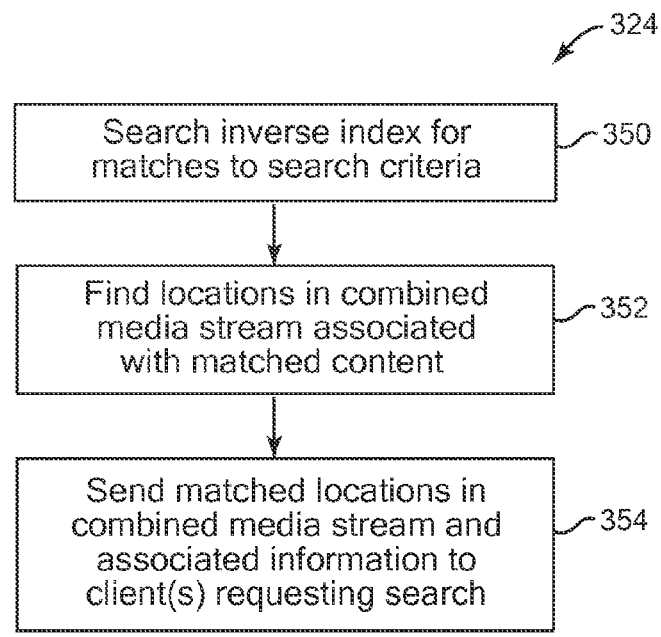
FIG. 5 is a flow diagram illustrating an example method for processing a search request at a server, according to one embodiment.

FIG. 5 is a flow diagram illustrating one example of a method for block 324 of FIG. 4 in which a search request is processed by a server. Search criteria have been received by the server to be applied to a designated combined media stream, such as one or more keywords and/or one or more names of speaker(s) in a combined media stream currently playing by a client. In some embodiments, the speaker(s) can be one or more of the users participating in the group communication encoded by the combined media stream.

In block 350, the inverse index of the combined media stream is searched for recognized content matching the search criteria. This includes matching the recognized content itself, such as words or phrases, and/or matching search criteria provided as a name of a speaker that contributed the recognized content, to speaker data associated with the recognized content. Depending on the embodiment, exact matches can be required, or matches of varying closeness can be allowed and ranked indicating the closeness of the match. In block 352, locations in the combined media stream are found which are associated with the matched recognized content (and associated with speaker search criteria, if any).

The locations can be found using the inverse index, which provides the locations associated with the matched recognized content and speakers.

In block 354, matched locations in the combined media stream and/or associated information are sent to the client(s) providing the search request. For example, the server can send a list of the matched recognized content, corresponding speakers, and the associated locations in the combined media stream. In the case of recognized content such as words or phrases, the location at which the word or phrase starts to be spoken can be provided. Similarly, if the search criteria specified to have results or playback based on segments such as sentences, paragraphs, and/or other longer segments of the stream, then the locations at which these segments start can be provided as results and/or as locations for playback by the client(s). In a case of a matched speaker, the locations corresponding to the beginning of each matched segment of the combined media stream spoken by the matched speaker can be provided, and/or portions or ranges of the media stream spoken by the matched speaker can be provided. The client accordingly displays the results for the user, e.g., in a GUI.

In other embodiments, the server can perform additional functions that are described above as provided by the client. For example, the server can receive the search request input from a user, display search results to the client, etc. Alternatively, a client can perform functions described above as performed by a server.

Figure 6:
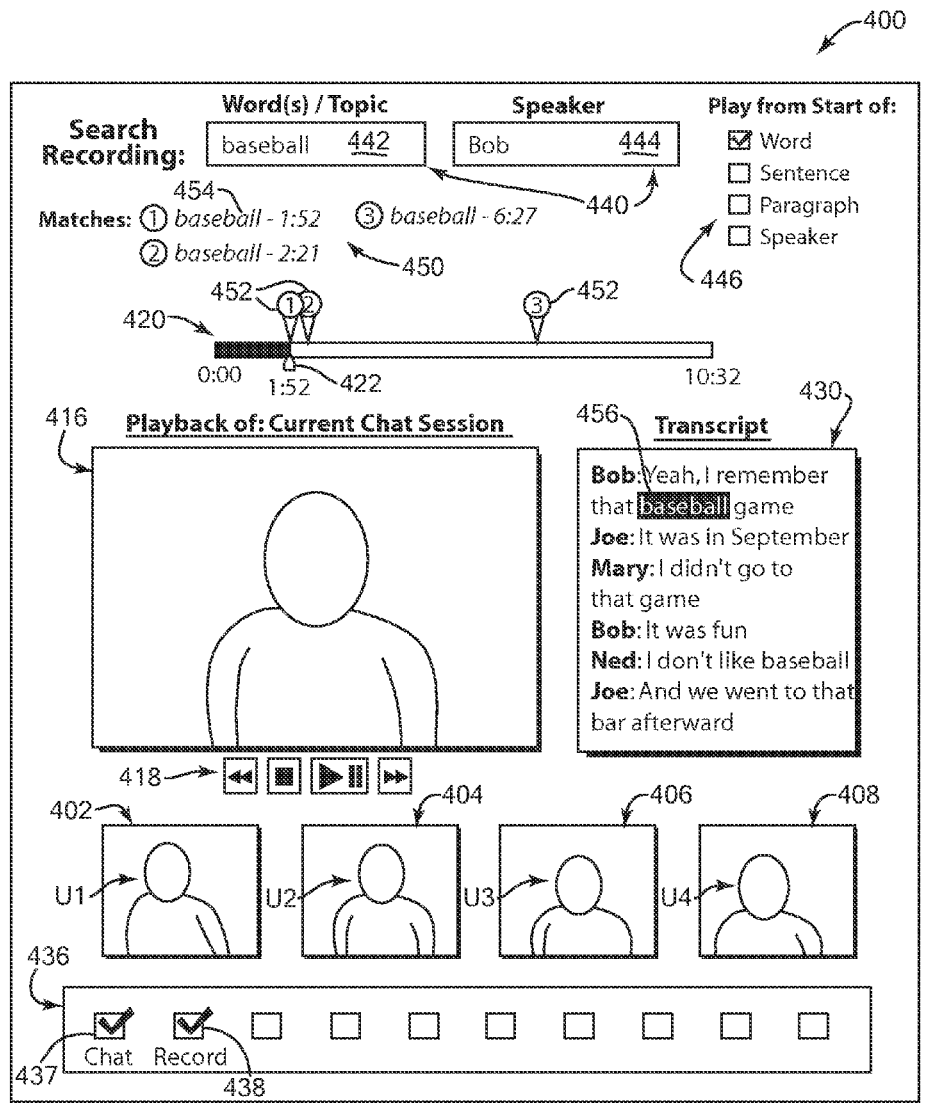
FIG. 6 is illustration of an example simplified graphical user interface (GUI), according to one embodiment.

FIG. 6 is a diagrammatic illustration of an example simplified graphical interface (GUI) 400 according to one embodiment. GUI 400 can be displayed on a display device, e.g., of a client device 120, 122, 124, and/or 126, or a server system 102 in some embodiments. The interface 400 includes one or more displayed windows within the GUI, or can be displayed in other forms in other interfaces.

In one embodiment, GUI 400 includes video windows 402, 404, 406, and 408, which display individual video streams picturing in real-time respective users U1, U2, U3, and U4 who are participating in a group communication, such as an audio/video chat or multi-user conference. The video images displayed in windows 402-408 can be taken by a camera at each client in the group, for example. Audio from each user in windows 402-408 can also be output, unless muted due to playback of a combined media stream or other selection. For ease of illustration, four users U1, U2, U3, and U4 are shown; various numbers of users can participate. Each user's speech is captured by a microphone at each client of the group.

In the example embodiment, GUI 400 includes a main video window 416, which can normally be used during the group communication to display the individual video stream of the user who is currently speaking or has the loudest sensed volume. For example, the main video window 416 can display a larger version of a corresponding video window 402, 404, 406, or 408. As in the example shown, the main window 416 can also be used to display video of a media stream being played back, where each user in the group is able to see and hear the video from a similar main view at their clients (e.g., if desired by each user, and/or if the user was selected by the user starting the playback). In the example of FIG. 6, the main view 416 displays a playback of a combined media stream that is encoding the current chat session and which includes the audio of all the users in the current session, as described above. The video displayed in main view 416 during playback of a communication recording can be the video which was displayed in the main view, or which would normally have been displayed in the main view in a group communication, without playback occurring. In other embodiments, other recordings or media streams can be played back. Other windows can also be displayed, such as an additional main view that always shows a live view of a speaking user in the group, a text chat window, additional video windows, etc.

Several controls can be displayed to allow a user to control the playback of the combined media stream in main window 416. In one example, standard playback controls 418 can be provided to allow pausing, stopping, fast forward, rewind, etc. A timeline bar 420 can be displayed to represent the length of the combined media stream (e.g., in time units), with a pointer 422 and/or progress bar showing the location in the stream of the video and audio currently being played. The timeline bar pointer 422 can indicate that the current playback in main view 416 of the combined media stream is at an earlier time in the current session. The pointer 422 can be dragged or moved by the user to display a corresponding portion of the combined media stream in main window 416. Since the current session is ongoing, the time displayed at the right of the timeline bar 420 can be continually increasing and the location of pointers such as pointer 422 continually adjusted in relation to the increasing media stream length as data is added to the combined stream based on data from ongoing individual streams.

A transcript window 430 can also be displayed in GUI 400. The recognized content associated with the combined media stream, such as text, is displayed in the transcript window 430 in synchronization with the playback of the combined media stream. For example, as a user displayed in main view 416 is speaking and the audio is output on a speaker device, the words spoken are displayed in text form in the transcript window 430, e.g., text lines scrolling within the window 430 as new speech is output from the stream. Each speaker of associated words can also be identified in the transcript window 430, as in the example shown.

Other controls can also be displayed in GUI 400. For example, in the embodiment of FIG. 6, GUI 400 includes controls 436 such as buttons or similar controls. The functionality of control buttons 436 can vary depending on specific implementations. In this example, a chat button 437 can select that a chat or conference mode is currently active for the client, and a "record" button 438 can select whether to record the current group communication, or to record the contribution of the user of this particular client. Additional functions can also be provided.

The GUI 400 can also include search request fields 440. For example, one field 442 can allow a user to specify one or more words (or phrase) to search for in the recording being viewed in the main view 416. A speaker field 444 can allow a user to specify one or more speakers as search criteria, e.g., in combination with the words in field 442. One or more speakers can be specified in field 444 while leaving field 442 blank to search only for the specified speakers. In addition, replay start options 446 can be provided in some embodiments to allow a user to specify which start location of the recorded media stream the playback is to start from, and/or start location(s) to be returned in the search results. These start location options can correspond to different segmentation division lines indexed for the combined media stream as described above. For example, in the example shown the user can specify that the playback of a search result should start at a location in the stream which is at the beginning of the matching word or phrase, is at the beginning of the sentence that includes the matching word/phrase, is at the beginning of the paragraph that includes the matching word/phrase, or is the location at which the speaker who spoke the matching word/phrase started speaking the segment that includes the matching word/phrase. If one of the search results is selected for replay, the combined media stream is played back starting at the location specified in options 446. In some embodiments, a user can select multiple options 446 to provide a search result location for each selected option, which can also be graphically indicated on timeline bar 420. Other types or lengths of media stream segments can also be selected in other embodiments. Other embodiments can also provide other options, such as starting replay at a location at the end of a selected segment in the media stream (word, paragraph, speaker segment, etc.), halfway through or at some other specified intermediate location in a selected segment, etc.

In the example of FIG. 6, search results or matches 450 for the criteria of the search request fields 440 have been received by the client and displayed in the GUI 400. For example, the matches can be listed in pairs, with the matched word found and its location in the combined media stream, here shown as a timestamp. In some embodiments, the matches can be displayed graphically, e.g., relative to the timeline bar 420. For example, each match indicator 452 can be associated with one of the matches 450, as shown, and points to the particular location in the combined media stream timeline bar 420 where the match occurred. In some embodiments, if many matches are found and/or a large portion of the combined media stream is matched, then a range can be indicated on the timeline bar 420 for the corresponding portion of the media stream, e.g., using a horizontal bracket or other indicator. If a longer portion of the media stream is matched to the search criteria, such as a phrase, sentence, or long section of the stream provided from a particular speaker, then match indicators 452 can point to the beginning of the matched portions.

In some embodiments, the user can select one of the match indicators 452 to cause the playback of the combined media stream in main window 416 to start at the selected location. For example, in the example of FIG. 6, the user has selected the first search result 454 or the associated match indicator 452, and the main view 416 displays the video frame at the corresponding location of the combined media stream, while the audio output starts at the same location if the stream is played. In some embodiments, the selected matched word can also be highlighted in the transcript window 430 after it has been played back and displayed as text, as shown by highlighted word 456.

Figure 7:
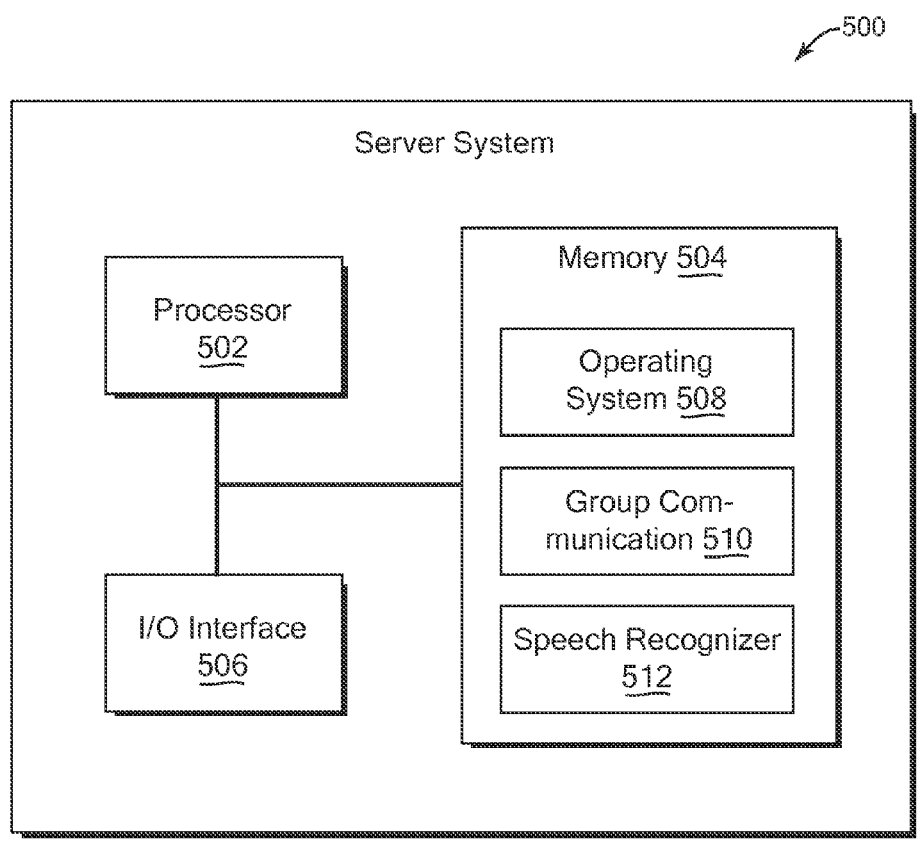
FIG. 7 is a block diagram of an example server device which may be used for one or more embodiments described herein.

FIG. 7 is a block diagram of an example server device 500, which may be used to implement some embodiments described herein. For example, server device 500 may be used to implement server device 104 of FIG. 1, and perform appropriate method embodiments described herein. Server device 500 can be any suitable computer system, server, or other electronic or hardware device. For example, the server device 500 can be a mainframe computer, desktop computer, workstation, portable computer, or electronic device (portable device, cell phone, smart phone, tablet computer, TV set top box, personal digital assistant (PDA), media player, game device, etc.). In some embodiments, server device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, group communication block 510, and speech recognizer 512. The group communication block 510 can provide instructions that enable processor 502 to perform functions described herein, e.g., the method of FIG. 4. Speech recognizer 512 can be used to provide recognized content from media streams as described above. Recognizer 512 can be provided in the same server device as the group communication block 510, or in a different server system or device. Any of software in memory 504 can alternatively be stored on any other suitable storage location or computer-readable medium. In addition, memory 504 (and/or other connected storage device(s)) can store received media streams, indexes, and other data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices such as memory and/or database 106, and input/output devices can communicate via interface 506. In some embodiments, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 7 shows one block for each of processor 502, memory 504, I/O interface 506, and software blocks 508, 510, and 512. These blocks may represent one or more processors or processing circuitries, operating systems, memories, I/O interfaces, applications, and/or software modules. In other embodiments, server device 500 may not have all of the components shown and/or may have other elements including other types of elements instead of, or in addition to, those shown herein. While system 102 is described as performing steps as described in some embodiments herein, any suitable component or combination of components of system 102 or similar system, or any suitable processor or processors associated with such a system, may perform the steps described.

A client device can also be used with features described herein, such as client devices 120-126 shown in FIG. 1. Example client devices can include some similar components as the server device 500, such as processor(s) 502, memory 504, and I/O interface 506. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, and a display device for outputting images or video. In some embodiments, the client devices 120-126 can be simple devices, such as devices used only for recording the associated speaker's voice including capturing the voice and encoding it in a media stream that is output to the server. For example, the client devices 120-126 can be microphones that provide audio streams to a server system, which can then send a combined media stream and recognized content based on the audio streams to a different system having a display, speaker devices, processor, etc.

As indicated above, embodiments enable a user to obtain recognized content in a media stream describing a group communication. In some embodiments, recognized content such as words can be recognized in substantially "real-time" from a stream of stored data that is encoding audio of an ongoing live group communication. This can allow a substantially real-time search to be performed against the combined media stream. For example, search criteria can be received during the live group communication and search results can be provided in substantially real-time during the communication, e.g., provided in a few seconds (or less) after receiving the search request. In some embodiments, a separate stream of media data is encoded for each user, and recognized content in each stream is associated with the user. The streams are synchronized and merged, and the recognized words are indexed to corresponding locations in the combined media stream representing times when the words were encoded in the stream. Embodiments can allow a user to search a media stream for content matching search criteria, such as keywords, phrases, and/or speakers of the content. Matching words and corresponding locations in the media stream can be provided as search results.

In one example, multiple users are participating in an online group communication, such as a chat session, that is being recorded. Any of the users can search the recording of the communication at any time for a word or phrase that was spoken earlier in the chat session, and/or for words or phrases spoken by a particular user. The user can be presented with results including matching words and corresponding times in the media stream of data encoding the communication, and can select to replay the media stream from any matched time, from the beginning of a spoken phrase having a matched word, or from the beginning of a portion provided by a particular speaker.

Embodiments described herein provide various benefits. For example, audio stream data encoding the speech of multiple contributors can be recognized for content accurately, since individual audio streams that encode each speaker individually are processed separately before being combined. Distinguishing and recognizing multiple different voices and speech from each other in the audio stream during, for example, interruptions or other occasions with multiple users speaking simultaneously thus does not present an issue. This also allows recognized content to be accurately associated with the user who spoke the content, allowing searches to be performed based on speaker. Graphical user interface features allow a user in the group communication to search and/or play the combined media stream and/or recognized content with ease and efficiency.

Although the description has been described with respect to particular embodiments thereof, these particular embodiments are merely illustrative, and not restrictive. Concepts illustrated in the examples may be applied to other examples and embodiments.

For example, in some embodiments different or additional indexes of recognized content than the ones described can be created and searched. In some embodiments, indexes to frequency of appearance of a word in the combined media stream, or indexes based on analysis of the recognized content can be created.

Note that the functional blocks, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some embodiments, multiple steps or blocks shown as sequential in this specification may be performed at the same time.

What is claimed is:

1. A method for indexing and searching for content in streamed data, the method comprising:

receiving a plurality of streams of audio data encoding a recording of a live ongoing group communication, wherein each stream of audio data encodes a recording of a different one of a plurality of voices, each of the plurality of voices provided by a different speaker in the live ongoing group communication;

providing each of the streams of audio data to a recognizer for separate recognition and receiving one or more recognized words from each of the streams of audio data, wherein the recognition includes use of a different speech recognition model for each stream of audio data to recognize the one or more recognized words, each speech recognition model being customized for word recognition for the voice encoded in the associated stream of audio data;

indexing the one or more recognized words with locations of data in each of the streams of audio data from which the one or more recognized words were recognized;

combining the streams of audio data into a combined stream of audio data by synchronizing at least one common location in the streams of audio data;

indexing the locations and the one or more recognized words in the combined stream of audio data with corresponding speakers of the one or more recognized words;

receiving one or more search criteria in a search request, the search criteria including at least one keyword and a specification of at least one particular speaker;

searching the combined stream of audio data for words matching the search criteria by using the indexing of the locations, of the one or more recognized words, and of the speakers; and providing matching words, corresponding locations, and corresponding speakers from the combined stream of audio data.

2. A method for indexing content in streamed data, the method comprising:

receiving a plurality of streams of audio data encoding a recording of a live ongoing group communication, wherein each stream of audio data encodes a different one of a plurality of voices;

providing each of the streams of audio data to a recognizer to cause separate recognition of one or more words in each of the streams of audio data, wherein the recognition of one or more words includes use of a plurality of different speech recognition models, each speech recognition model used on a different one of the streams of audio data to recognize the one or more words, wherein one or more of the speech recognition models are each customized for word recognition for the voice encoded in the associated stream of audio data;

indexing the one or more recognized words with corresponding locations in each of the streams of audio data; and combining the streams of audio data into a combined stream of audio data by synchronizing at least one common location in the streams of audio data.

3. The method of claim 2 wherein each of the voices is provided by a different speaker in the live ongoing group communication, and further comprising indexing the locations in the combined stream of audio data with corresponding speakers of the recognized words that correspond to the locations.

4. The method of claim 3 wherein indexing the locations with corresponding speakers includes determining when a change of speaker occurs in the combined audio stream and indexing locations in the combined audio stream corresponding with the change of speaker.

5. The method of claim 2 wherein each of the speech recognition models is customized for word recognition for the voice encoded in the associated stream of audio data.

6. The method of claim 2 wherein the indexing includes:
updating a plurality of indexes with the one or more recognized words to the corresponding locations in associated ones of the streams of audio data; and
updating an aggregated index combining information from the plurality of indexes.

7. The method of claim 2 further comprising:
receiving one or more search criteria in a search request;
searching the combined stream of data for matches to the search criteria by using the indexing of the locations and of the one or more recognized words; and
providing matches and corresponding matched locations in the combined stream of audio data.

8. The method of claim 7 wherein the one or more search criteria are received during the live ongoing group communication, and wherein the matches and corresponding matched locations are provided in substantially real-time during the live ongoing group communication.

9. The method of claim 7 wherein the search criteria include at least one keyword, and wherein the provided matches include one or more of the recognized words matching the at least one keyword.

10. The method of claim 7 wherein each of the voices is provided by a different speaker in the live ongoing group communication, and further comprising indexing the one or more recognized words in the combined stream of audio data to corresponding speakers of the recognized words, wherein the search criteria include a specification of at least one particular speaker, such that words spoken by the particular speaker from the combined stream of audio data are matched to the search criteria specifying the at least one particular speaker.

11. The method of claim 7 wherein the provided corresponding matched locations in the combined stream of audio data include locations at which segments of the combined media stream start, the segments including the matches.

12. The method of claim 11 wherein the segments include at least one of:
segments corresponding to a speaker and divided by a change of the speaker, and
segments divided by pauses in the voices of the speakers.

13. The method of claim 2 wherein the streams of audio data are accompanied by at least one corresponding stream of video data encoding a recording of the live ongoing group communication.

14. The method of claim 2 wherein each stream of audio data is accompanied by a stream of video data, and further comprising combining the streams of video data into a combined stream of video data that includes data from a plurality of the streams of video data.

15. The method of claim 2 wherein each of the streams of audio data is received from a different client device over a communication network, and wherein the streams of audio data are derived from a plurality of microphones, each microphone associated with one of a plurality of speakers providing the voices in the live ongoing group communication at an associated client device.

16. The method of claim 2 further comprising providing the combined media stream and the one or more recognized words to a client device to be output.

17. A system for indexing content in streamed data, the system comprising:
a storage device storing a plurality of streams of audio data encoding a recording of a live ongoing group communication, wherein each stream of audio data encodes a different one of a plurality of voices; and
at least one processor accessing the storage and operative to perform operations comprising:
providing each of the streams of audio data to a recognizer to cause separate recognition of one or more words in each of the streams of audio data, wherein the recognition of one or more words includes use of a plurality of different speech recognition models, each speech recognition model used on a different one of the streams of audio data to recognize the one or more words, wherein one or more of the speech recognition models are each customized for word recognition for the voice encoded in the associated stream of audio data;
indexing the one or more recognized words with corresponding locations in each of the streams of audio data; and
combining the streams of audio data into a combined stream of audio data by synchronizing at least one common location in the streams of audio data.

18. The system of claim 17 wherein the at least one processor is further operative to perform operations comprising:
receiving one or more search criteria in a search request;
searching the combined stream of data for matches to the search criteria by using the indexing of the locations and of the one or more recognized words; and
providing matches and corresponding matched locations in the combined stream of audio data.

19. The system of claim 18 wherein each of the voices is provided by a different speaker in the live ongoing group communication, and further comprising indexing the locations in the combined stream of audio data with corresponding speakers of the recognized words that correspond to the locations, wherein the search criteria include a specification of at least one particular speaker, such that recognized words spoken by the particular speaker from the combined stream of audio data are matched to the search criteria specifying the at least one particular speaker.

* * * * *